No. 30,710. H. AUSTIN. WATER CART AND FIELD ROLLER. PATENTED NOV. 27, 1860.
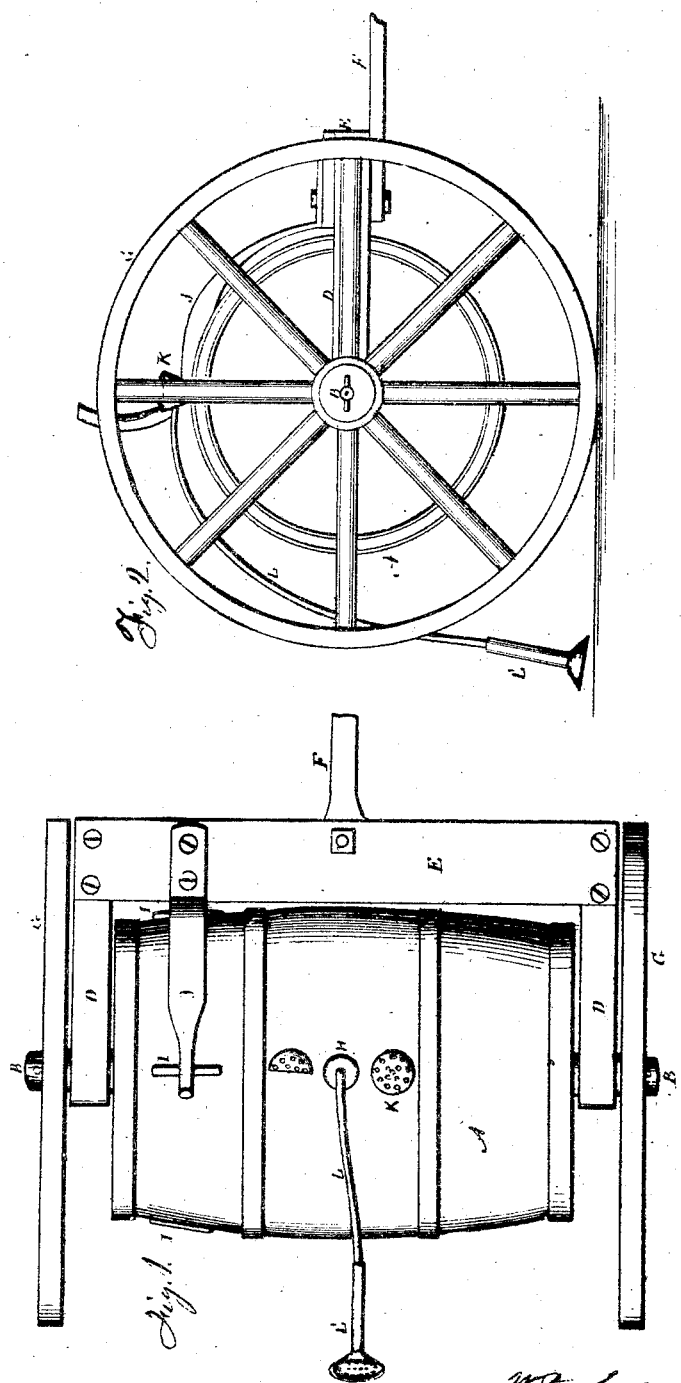

UNITED STATES PATENT OFFICE.

HAINES AUSTIN, OF EAST LIBERTY, OHIO.

WATER-CART.

Specification of Letters Patent No. 30,710, dated November 27, 1860.

*To all whom it may concern:*

Be it known that I, HAINES AUSTIN, of East Liberty, in the county of Logan and State of Ohio, have invented a new and useful Agricultural Implement or Machine for Carrying Liquid Manure, Maple Sap, and Water for Watering Crops, also for Rolling Land, &c.; and I do hereby declare that the same is described and represented in the following specification and drawings.

To enable others skilled in the art to make and use my invention I will proceed to describe its construction and operation referring to the drawings in which the same letters indicate like parts in each of the figures.

Figure 1, is a plan or top view of my agricultural implement or machine. Fig. 2, is an elevation of one side.

The nature of my invention consists in the arrangement of devices hereinafter described.

In the accompanying drawings A, is a cask provided with journals B, B, which may be fastened to the heads of the cask by means of plates or arms, or the journals may be made on a shaft extending through the cask.

D, D, are two bars perforated so that the journals B, will turn freely in them, which bars are connected together by the bar E, to which they are firmly fastened as shown in the drawing.

F, is a tongue or pole firmly fastened to the bar E, and to this pole the animals may be harnessed in some convenient manner to draw the machine.

The journals B, B, extend through the bars D, and form pivots for the wheels G, G, to turn on which carry the cask and its contents when drawn from place to place, when it is used to carry water, liquid manure, maple sap or cider, as it is admirably adapted to carrying any kind of liquid for farming purposes, and for which it is particularly designed.

H, is the bunghole through which it may be filled or emptied; and I, I′, are stops fastened to the cask A, and caught by the spring pawl J, which has a score in it, so as to hold the cask in the position desired for filling and delivering. The pawl J, is fastened to the bar E as shown in the drawing.

K, is a perforated sprinkler which may be inserted in the cask and used to water rows of crops as it is drawn through a field. L′, is a sprinkling pipe connected by a hose to the bung of the cask and may be used for sprinkling crops also. And to make the streams from the sprinkler flow parallel the outside face of the end of the pipe is made concave which is found to produce the effect of making the several streams issuing from it to flow parallel, so as to confine the water to the plants being watered. This cask may be provided with one or more valves opening inward, so that when it is carried into a pond or river it will fill readily, by the water flowing into it; and when full may be used to water crops with great facility.

If the cask A, is made nearly straight on the outside and the hoops heated and shrunk on like wheel tire; it will serve a good purpose as a field roller if the wheels are removed from the journals; and the weight of the cask or roller may be adjusted by partially filling the cask with water; and it is believed that it may be drawn far easier, than either a solid roller or a roller with a loaded frame over it. If the journals are connected by a strong shaft, made so as to be readily removed from the cask; a cart body may be fastened to it, so as to serve as a good farm cart with the draft frame and wheels. And in the several ways above mentioned it may be made to serve several purposes on a farm with great facility, utility and economy. And by applying a proper sprinkler may be used to sprinkle streets.

I believe I have described and represented my improved water cart and field roller, so as to enable any person skilled in the art to make and use it, I will now state what I desire to secure by Letters Patent.

I claim—

As a new agricultural implement a cask with journals, and wheels, the whole being constructed and arranged in the manner and for the purpose specified.

HAINES AUSTIN.

Witnesses:
T. F. PRATT,
J. D. MAROT.